US010636221B2

(12) United States Patent
Li et al.

(10) Patent No.: US 10,636,221 B2
(45) Date of Patent: Apr. 28, 2020

(54) INTERACTION METHOD BETWEEN USER TERMINALS, TERMINAL, SERVER, SYSTEM, AND STORAGE MEDIUM

(71) Applicant: TENCENT TECHNOLOGY (SHENZHEN) COMPANY LIMITED, Shenzhen, Guangdong (CN)

(72) Inventors: Bin Li, Guangdong (CN); Xiao Bo Chen, Guangdong (CN); Yu Chen, Guangdong (CN); Cheng Luo, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/364,370

(22) Filed: Mar. 26, 2019

(65) Prior Publication Data
US 2019/0221045 A1 Jul. 18, 2019

Related U.S. Application Data

(63) Continuation of application No. PCT/CN2017/117058, filed on Dec. 19, 2017.

(30) Foreign Application Priority Data

Dec. 21, 2016 (CN) .......................... 2016 1 1191383

(51) Int. Cl.
*G06T 19/00* (2011.01)
*G06T 13/40* (2011.01)
*G06F 3/0484* (2013.01)
(52) U.S. Cl.
CPC .......... *G06T 19/006* (2013.01); *G06F 3/0484* (2013.01); *G06T 13/40* (2013.01)

(58) Field of Classification Search
None
See application file for complete search history.

(56) References Cited

U.S. PATENT DOCUMENTS 6,057,856 A * 5/2000 Miyashita ............... G06T 15/00
345/633
9,247,201 B2 * 1/2016 Li ........................... A63F 13/12
(Continued)

FOREIGN PATENT DOCUMENTS

CN            1743043 A     3/2006
CN         101127737 A     2/2008
(Continued)

OTHER PUBLICATIONS

Communication dated Aug. 30, 2019 from the State Intellectual Property Office of the P.R.C. in counterpart Application No. 201611191383.0.
(Continued)

*Primary Examiner* — James A Thompson
(74) *Attorney, Agent, or Firm* — Sughrue Mion, PLLC

(57) ABSTRACT

A method performed by a first user terminal is provided. The method includes: obtaining geographical location information of a first virtual character; sending the geographical location information of the first virtual character to a server; receiving information from the server and identifying a second virtual character within a range of the geographical location of the first virtual character; sending an interaction request for the second virtual character to the server; obtaining an interaction scene image, the interaction scene image being a real scene image corresponding to the first user terminal; rendering the first virtual character and the second virtual character into the interaction scene image; obtaining interaction content; and sending the interaction content to the server through the first connection, the interaction con-
(Continued)

tent causing the server to send the interaction content to the second user terminal through the second connection.

19 Claims, 11 Drawing Sheets

(56) References Cited

U.S. PATENT DOCUMENTS

| | | | | |
|---|---|---|---|---|
| 9,357,025 | B2* | 5/2016 | Cozzi | H04W 4/021 |
| 9,947,139 | B2* | 4/2018 | Yasutake | G06T 19/006 |
| 10,068,374 | B2* | 9/2018 | Miller | G06T 19/006 |
| 2010/0322111 | A1* | 12/2010 | Li | A63F 13/12 |
| | | | | 370/260 |
| 2015/0193982 | A1* | 7/2015 | Mihelich | H04W 4/026 |
| | | | | 345/633 |
| 2015/0235434 | A1* | 8/2015 | Miller | G06T 19/006 |
| | | | | 345/633 |
| 2015/0296338 | A1 | 10/2015 | Xu | |
| 2015/0371447 | A1* | 12/2015 | Yasutake | G06T 19/006 |
| | | | | 345/420 |
| 2018/0144396 | A1* | 5/2018 | Yin | G06Q 30/0207 |
| 2018/0225880 | A1* | 8/2018 | Yasutake | G06T 19/006 |

FOREIGN PATENT DOCUMENTS

| | | |
|---|---|---|
| CN | 102981761 A | 3/2013 |
| CN | 103368816 A | 10/2013 |
| CN | 103905291 A | 7/2014 |
| CN | 103929479 A | 7/2014 |
| WO | 2015/135476 A1 | 9/2015 |

OTHER PUBLICATIONS

Communication dated Apr. 4, 2019 from the State Intellectual Property Office of the P.R.C. in application No. 201611191383.0.
International Search Report of PCT/CN2017/117058 dated Feb. 11, 2018.
Communication dated Dec. 19, 2019, from the China National Intellectual Property Administration in counterpart Application No. 201611191383.0.

* cited by examiner

US 10,636,221 B2

INTERACTION METHOD BETWEEN USER TERMINALS, TERMINAL, SERVER, SYSTEM, AND STORAGE MEDIUM

CROSS-REFERENCE TO RELATED APPLICATIONS

This application is a continuation of International Patent Application No. PCT/CN2017/117058, which claims priority from Chinese Patent Application No. 201611191383.0, filed with the Chinese Patent Office on Dec. 21, 2016 and entitled "INTERACTION METHOD BETWEEN VIRTUAL CHARACTERS, TERMINAL, SERVER, AND SYSTEM," the disclosures of which are incorporated herein by reference in their entireties.

BACKGROUND

Field

Methods and apparatuses consistent with example embodiments relate to communications technologies, and specifically, to an interaction method between user terminals, a terminal, a server, a system, and a storage medium.

Description of Related Art

A related technology combines real information with virtual information, for example, an augmented reality technology and a mix reality technology. Improved methods are needed to take full advantage of mobile Internet resources to perform information extension and experience augmentation on the physical world observed by users.

SUMMARY

In view of this, various example embodiments provide a method, terminal, server, system, and storage medium, to implement interactions between virtual characters.

According to an aspect of an example embodiment, there is provided a method performed by one or more processors of a first user terminal, the method including: obtaining geographical location information of a first virtual character corresponding to the first user terminal; sending the geographical location information of the first virtual character to a server, the server storing information identifying the first virtual character and the geographical location information of the first virtual character in a mapping table; receiving information from the server and identifying a second virtual character within a range of the geographical location information of the first virtual character; sending an interaction request for the second virtual character to the server according to the information identifying the second virtual character, the interaction request causing the server to establish a first connection to the first user terminal and a second connection to a second user terminal corresponding to the second virtual character; obtaining an interaction scene image, the interaction scene image being a real scene image corresponding to the first user terminal; rendering the first virtual character and the second virtual character into the interaction scene image; obtaining interaction content; and sending the interaction content to the server through the first connection, the interaction content causing the server to send the interaction content to the second user terminal through the second connection.

According to other aspects of one or more example embodiments, there is also provided apparatuses, systems and non-transitory computer readable mediums consistent with the system above.

DETAILED DESCRIPTION

The following clearly and completely describes the technical solutions in embodiments of the present disclosure with reference to the accompanying drawings. The described embodiments are only some embodiments instead of all embodiments of the present disclosure. All other embodiments obtained by persons skilled in the art based on the embodiments of the present disclosure without creative efforts fall within the protection scope of the embodiments of the present disclosure.

The embodiments provide an interaction method between virtual characters, a terminal, a server, and a system, to implement interactions between the virtual characters.

Figure 1A:
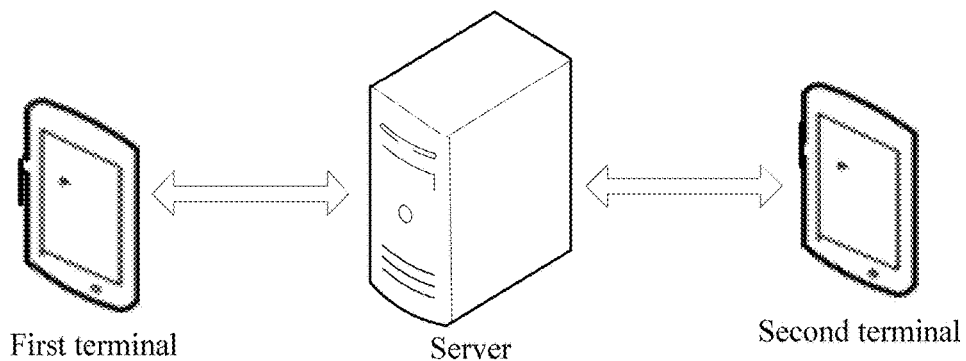
FIG. 1A is a schematic diagram of a scenario of an interaction method between virtual characters according to an embodiment of the present invention.

As shown in FIG. 1A, an embodiment includes a terminal and a server. There may be a plurality of terminals. A user of each terminal may create a virtual character on the terminal, and then information about the virtual character created by the user is reported to the server. The reported information may include the virtual character and location information of the virtual character. The location information, for example, may be latitude and longitude values or geographical coordinates values. The server correspondingly stores each virtual character and the location information of each virtual character in a database. When a virtual character (a first virtual character) created by a user of a certain terminal (for example, a first terminal) desires to interact with another virtual character (for example, a second virtual character created by a user of a second terminal), the first terminal may send location information of the first virtual character to the server, and the server may feed back, to the first terminal, information about the second virtual character within a preset distance (for example, 50 meters or 100 meters) range of a location indicated by the location information. After receiving the information of the second virtual character, the first terminal may obtain an interaction request initiated by the first virtual character to the second virtual character, then send the interaction request to the server, and receive an interaction scene generated by the server according to the interaction request. The first terminal may render the first virtual character and the second virtual character into the interaction scene, to implement interactions between the virtual characters. The interactions may include an interaction such as a voice chat, a video chat, or a text chat, or may be a location traversal interaction. The interactions between the virtual characters may be implemented, and therefore, an application scenario of the method according to this embodiment includes but is not limited to social, an advertisement, a game, a store, and the like.

Figure 1B:
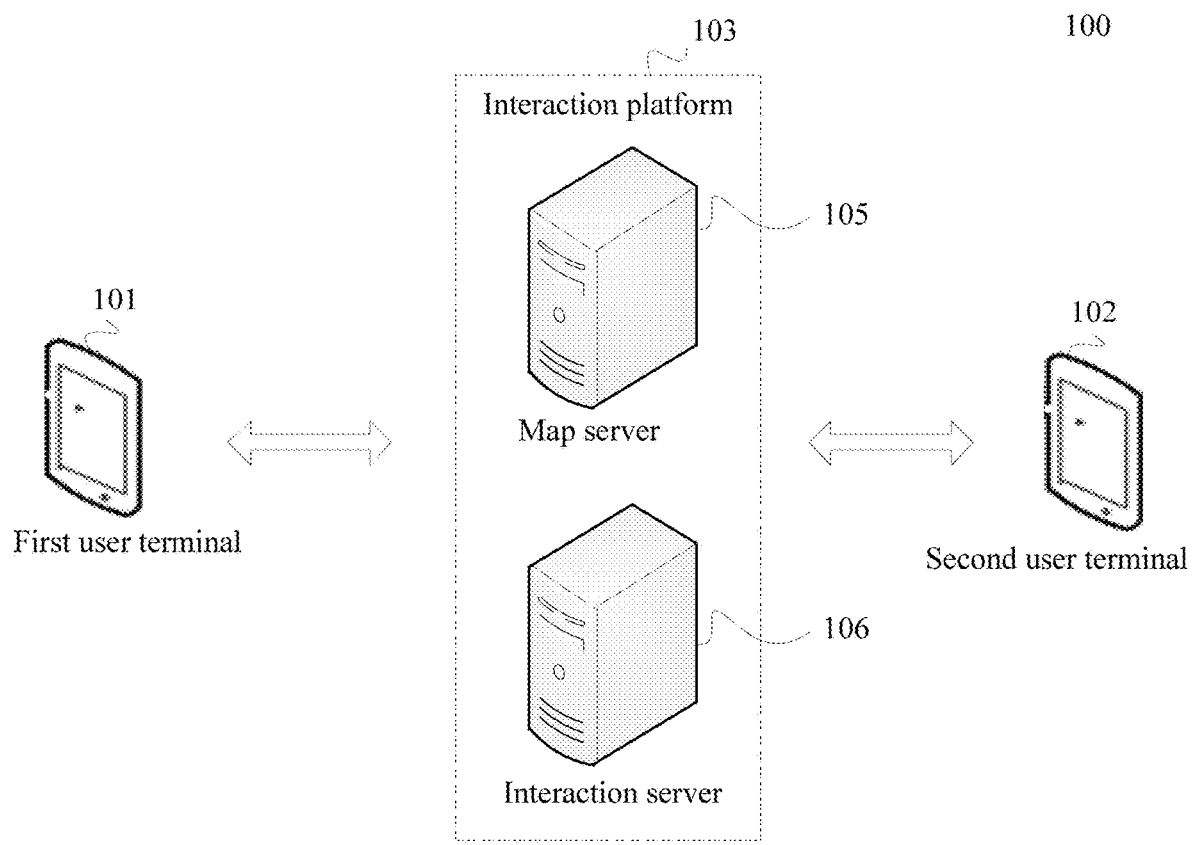
FIG. 1B is a schematic diagram of a system according to another embodiment of the present invention.

A schematic diagram of another system according to an embodiment of this application is shown in FIG. 1B. The system 100 may include: a first user terminal 101, a second user terminal 102, and an interaction platform 103. The interaction platform 103 includes a map server 105 and an interaction server 106. The system 100 may include a plurality of first user terminals and a plurality of second user terminals. In FIG. 1B, the first user terminal 101 and the second user terminal 102 are used only as an example for describing solutions of each embodiment.

A user of each user terminal (including the first user terminal 101 and the second user terminal 102) may create a virtual character on the user terminal. For example, a first virtual character corresponding to the first user terminal may be a virtual character created by a user at the first user terminal according to facial information of the user. Feature data of the virtual character created by the user is then sent to the interaction platform 103, and the interaction server 106 in the interaction platform 103 stores the feature data of the first virtual character. The interaction platform includes an interaction server and a map server. The interaction server may be an interaction server that provides an augmented reality interaction service, and the map server may be a server that is of a third party and that provides a map service. The terminal sends the feature data of the created virtual character to the interaction server in the interaction platform, and the reported feature data of the virtual character, for example, includes facial feature data, a facial map, decoration data, and the like. The interaction server associatively stores an identifier of the virtual character and the feature data of the virtual character. The user may create the first virtual character in an interaction application. For example, the interaction application is an augmented reality interaction APP. The user may create a virtual character in the augmented reality interaction APP, and sends feature data of the created virtual character to the interaction server.

A map function may also be integrated in the interaction application. When the user operates on a map icon, the interaction application sends geographical location information of the first virtual character corresponding to the first user terminal to the interaction platform 103. The geographical location information, for example, may be latitude and longitude values or geographical coordinates values. After receiving the geographical location information of the first virtual character, the interaction server 106 in the interaction platform 103 associatively stores the geographical location information of the first virtual character that is sent by the first user terminal 101 and an identifier of the first virtual character. In addition, the interaction server 106 also associatively stores, in a database, an identifier of each virtual character and geographical location information of each virtual character that are reported by each terminal. That is, the interaction server 106 stores a mapping table between a virtual character and geographical location information. When the interaction server 106 receives the geographical location information of the first virtual character that is sent by the first user terminal 101, the sever searches the mapping table between a virtual character and geographical location information for a second virtual character within a preset distance (for example, 50 meters or 100 meters) range of a location indicated by the geographical location information of the first virtual character. There may be one or more second virtual characters. In addition, information about the one or more second virtual characters is obtained, and the information about each second virtual character may include feature data and geographical location information. The interaction server 106 sends the obtained information about the one or more second virtual characters to the first user terminal 101.

After receiving the geographical location information of the first virtual character, the map server 105 in the interaction platform 103 obtains map data corresponding to the geographical location information. The map server 105 sends the obtained map data to the first user terminal 101.

The first user terminal 101 presents a map according to the received map data, and presents the one or more second virtual characters on the map according to the received information about the one or more second virtual characters. The user selects one of the second virtual characters, and the interaction application on the first user terminal 101 obtains an interaction scene image in response to the selection operation of the user, renders the first virtual character and the selected second virtual character into the interaction scene image, and sends an interaction request to the interaction server 106 in the interaction platform. In response to the interaction request, the interaction server 106 establishes a first connection to the first user terminal and establishes a second connection to the second user terminal corresponding to the second virtual character. During subsequent interaction, the first user terminal sends interaction content to the interaction server 106 through the first connection, and the interaction server 106 sends the interaction content to the second user terminal through the second connection.

Figure 2A:
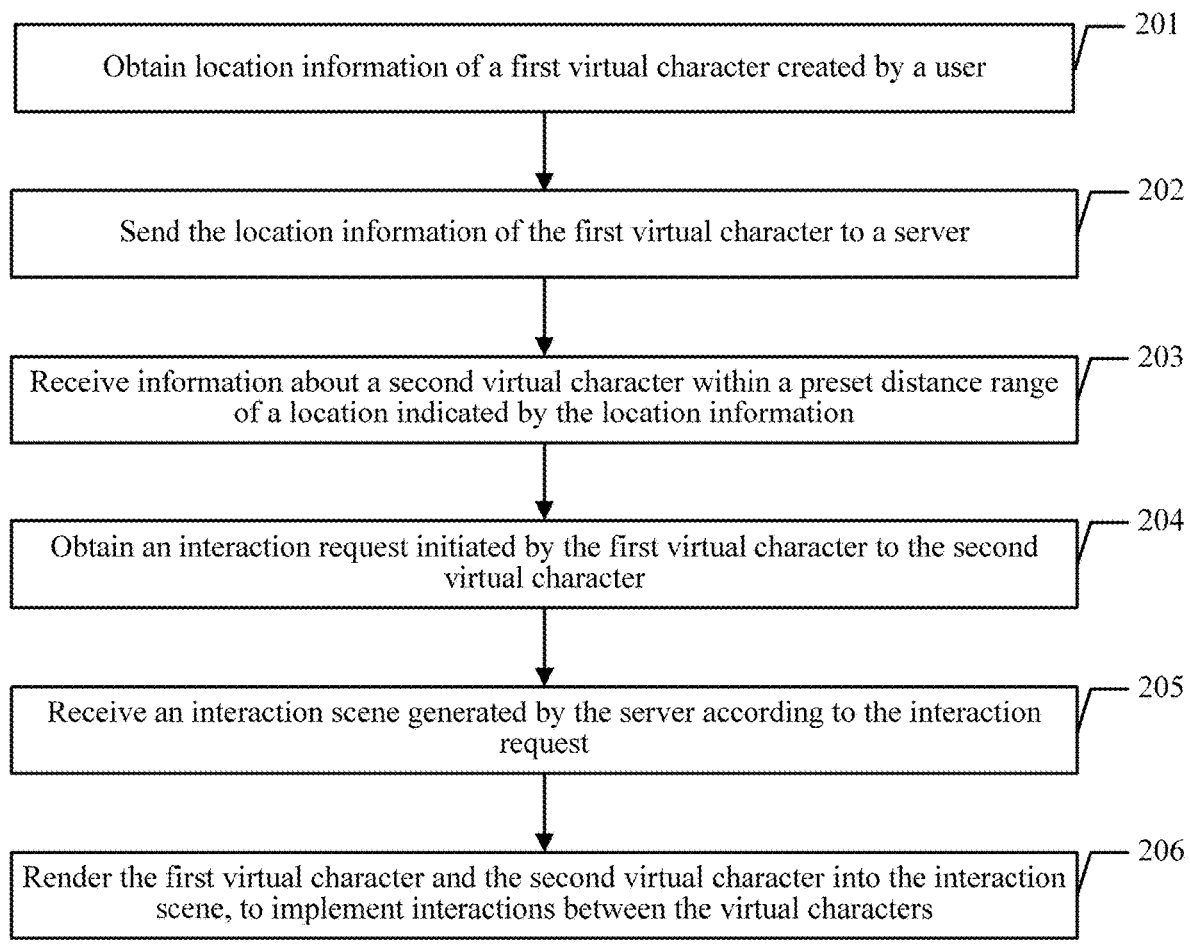
FIG. 2A is a schematic flowchart of an interaction method between virtual characters according to an embodiment of the present invention.

An embodiment shown in FIG. 2A describes an interaction method between virtual characters according to an embodiment from a perspective of a terminal. The method is applied to the first terminal or the second terminal in FIG. 1A. As shown in FIG. 2A, the method of this embodiment includes the following steps:

Step S201: Obtain location information of a first virtual character created by a user.

In a specific implementation, the first virtual character may be created by the user according to facial information of the user. That is, the user may scan a face part by using a human face scanning system, to obtain facial feature data and a facial map, where the facial feature data may include feature data of parts such as a mouth, a nose, eyebrows, a face, and a chin; then blends the obtained facial feature data and the facial map with a face part of a preset virtual character model; and at last, selects a decoration from a decoration interface provided by the terminal, and blends the selected decoration with a corresponding part of the preset virtual character model. In a specific embodiment, the decoration interface may be shown in FIG. 2C. The decoration provided in the decoration interface includes but is not limited to a hairstyle, clothes, pants, shoes, and the like. Alternatively, the first virtual character may be a related virtual character directly selected by the user from a system. The first virtual character may be a character, an animal, or another cartoon image, and the first virtual character may be three-dimensional or planar, which is not specifically limited herein.

After a user of each terminal creates a virtual character on the terminal, the corresponding terminal may obtain location information of the virtual character created by the user. The location information may be location information of the terminal, or may be location information after the corresponding virtual character performs a location traversal. The location information may be latitude and longitude values or geographical coordinates values. Specifically, the terminal may obtain the location information by using a software development kit (SDK) of a map application, or obtain the location information by using an application programming interface (API) of a location related application (for example, a social application, a game application, or a life service application) provided in a system, which is not specifically limited herein. After obtaining the location information, each terminal may send the virtual character created by the user and the location information of the virtual character to a server. The server may also set some virtual characters and set location information for these virtual characters. The server may establish a mapping table of <virtual character, location information> according to virtual character information reported by each terminal and virtual character information set by the server, and save the established mapping table into a database.

For ease of description, in this embodiment, the virtual character created by the user of the terminal may be referred to as the first virtual character, and another virtual character may be referred to as a second virtual character. The second virtual character may be created by a user of another terminal (the another terminal may control the virtual character, for example, change a location of the virtual character, replace a decoration of the virtual character, or change an online/offline state of the virtual character), or may be set by the server (the server may control the virtual character). When the first virtual character desires to interact with the second virtual character, the terminal may send the location information of the first virtual character to the server.

Step S202: Send the location information of the first virtual character to a server.

In addition, the terminal may further send preset distance information to the server. A preset distance may be user-defined according to an actual need, for example, may be 40 meters, or 80 meters.

Step S203: Receive information about a second virtual character within a preset distance range of a location indicated by the location information.

After receiving the location information and the preset distance information, the server may query, according to the mapping table of <virtual character, location information> stored in the database, the second virtual character within the preset distance range of the location indicated by the location information.

For example, when the location information is 22° 34' N and 113° 49' E, and the preset distance information is 40 meters, the server may query all second virtual characters existing within 40 meters away from the location at 22° 34'N and 113° 49' E; and when the preset distance information is 80 meters, the server may query all second virtual characters existing within 80 meters away from the location at 22° 34' N and 113° 49' E. There may be a plurality of second virtual characters obtained through querying, and the sever sends information about the second virtual characters obtained through querying to the terminal.

Specifically, the server may determine, according to a value of the preset distance and/or a quantity of the second virtual characters obtained through querying, specific information returned to the terminal. For example, when the preset distance is less than a distance threshold (for example, 50 meters or 100 meters), character location list information (including each specific second virtual character and location information of each specific second virtual character) of the second virtual characters may be returned to the terminal; and when the preset distance is greater than or equal to the distance threshold, location quantity aggregation information (which may include only a quantity of second virtual characters aggregated at each location and does not include specific virtual character information) of the second virtual characters may be returned to the terminal. For example, aggregation may be performed by using <latitude and longitude center, quantity>. For another example, when a quantity of the second virtual characters obtained through searching is less than a quantity threshold (for example, 5 or 10), character location list information (including each specific second virtual character and location information of each specific second virtual character) of the second virtual characters may be returned to the terminal; and when the quantity of the second virtual characters obtained through searching is greater than or equal to the quantity threshold, location quantity aggregation information (which may include only a quantity of second virtual characters aggregated at each location and does not include specific virtual character information) of the second virtual characters may be returned to the terminal.

If information fed back by the server and received by the terminal is the location quantity aggregation information of the second virtual characters, the terminal may obtain each specific second virtual character aggregated at a certain location and detailed location information according to an operation of the user (for example, clicking on the aggregation location).

Then, the user may select a second virtual character from the plurality of second virtual characters, and the terminal determines the second virtual character selected by the user.

Step S204: Obtain an interaction request initiated by the first virtual character to the second virtual character.

That is, the interaction request initiated by the first virtual character to the second virtual character selected by the user is obtained.

Step S205: Receive an interaction scene generated by the server according to the interaction request.

After obtaining the interaction request, the terminal may send the interaction request to the server. The server may determine, according to a maintained online state of each virtual character, whether the second virtual character is online; directly return a request failure notification message to the terminal if the second virtual character is offline; and generate the interaction scene according to the interaction request if the second virtual character is online. The terminal receives the interaction scene generated by the server.

When the first virtual character desires to interact with the second virtual character, the terminal may send the location information of the first virtual character to the server.

In a specific implementation, the interaction request may be a chat interaction request (for example, an interaction such as a voice chat, a video chat, or a text chat). Correspondingly, the generated interaction scene may be a real scene image corresponding to the location information of the first virtual character by default. The real scene image may be a map image corresponding to the location information, or a streetscape image corresponding to the location information, or a real scene image corresponding to the location information.

Alternatively, the interaction request may be a location traversal interaction request. The interaction request may include designated location information. Correspondingly, the generated interaction scene may be a real scene image corresponding to the designated location information. A designated location may be any location on a map, or the designated location may be any location having a streetscape on the map. The real scene image corresponding to the designated location information may be a map image, or may be a streetscape image.

Step S206: Render the first virtual character and the second virtual character into the interaction scene, to implement interactions between the virtual characters.

In a specific implementation, the rendered interaction scene may be blending presentation of the virtual characters and the map. For example, as shown in FIG. 2D, a first virtual character S1 and a second virtual character S2 are rendered into a map image around the first user terminal. Alternatively, the rendered interaction scene may be blending presentation of the virtual characters and the streetscape. For example, as shown in FIG. 2E, a first virtual character S1 and a second virtual character S2 are rendered into a streetscape image between two buildings. Alternatively, the rendered interaction scene may be blending presentation of the virtual characters and the real scene. For example, as shown in FIG. 2F, a first virtual character S1 and a second virtual character S2 are rendered into an office scene. It should be noted that FIGS. 2D, 2E and 2F are merely some effect presentation images of the interaction scene, and in practice, do not constitute a limitation to a final presentation effect.

In a specific implementation, each virtual character may perform a chat interaction in the interaction scene, for example, perform an interaction such as a voice chat, a text chat, or a video chat. Each virtual character may alternatively perform a location traversal interaction in the interaction scene. For example, each virtual character may traverse to a same location having a streetscape, and therefore, an effect of viewing the streetscape is simulated.

Then, if the second virtual character selected by the user has an update (including a location update, and/or a decoration update, and/or an online/offline state update), the terminal receives an update notification message sent by the server, and the terminal may update, according to the update notification message, the second virtual character rendered in the interaction scene.

The interactions between the virtual characters may be implemented, and therefore, an application scenario of the method of this embodiment includes but is not limited to social, an advertisement, a game, a store, a life service, a travel, and other scenarios. The following describes the application scenario of the method of this embodiment by using several examples.

For example, the method of this embodiment may be applied to social. Different users may create respective virtual characters on a same social application. The virtual characters may add each other as a friend, and virtual characters that become friends may initiate an interaction such as a text chat or a voice chat. On an interface of the social application, the terminal may render the interactive virtual characters into the interaction scene such as a map, a streetscape, or a real scene, to present an interaction effect of virtual and physical combination.

For example, the method of this embodiment may be applied to a game. A user may create a virtual character in a game application, and contest or battle against a virtual character created by another in the game application, or contest or battle against a virtual character configured by the server for the user. On an interface of the game application, the terminal may render the interactive virtual characters into the interaction scene such as a streetscape, or a real scene, to present an interaction effect of virtual and physical combination.

For another example, the method of this embodiment may be applied to an advertisement. A user may create a virtual character in an advertisement application. In the advertisement application, the terminal may render the virtual character of the user and a virtual character configured by the server for the user together into a streetscape designated by a merchant. The streetscape image is updated in real time according to an operation (for example, moving forward, moving backward, or turning) of the user, to present an effect that the virtual characters view or tour the streetscape together, so as to achieve an effect of stimulating scenic spot traveling experience.

In this embodiment, the terminal may obtain the location information of the first virtual character created by the user, and send the location information of the first virtual character to the server; then receive the information about the second virtual character within the preset distance range of the location indicated by the location information, and obtain the interaction request initiated by the first virtual character to the second virtual character; and receive the interaction scene generated by the server according to the interaction request, and render the first virtual character and the second virtual character into the interaction scene. According to this embodiment, different virtual characters are rendered into a same real interaction scene, thereby implementing interactions between the virtual characters, and expanding an application scenario of technologies related to virtual and physical combination.

Figure 2B:
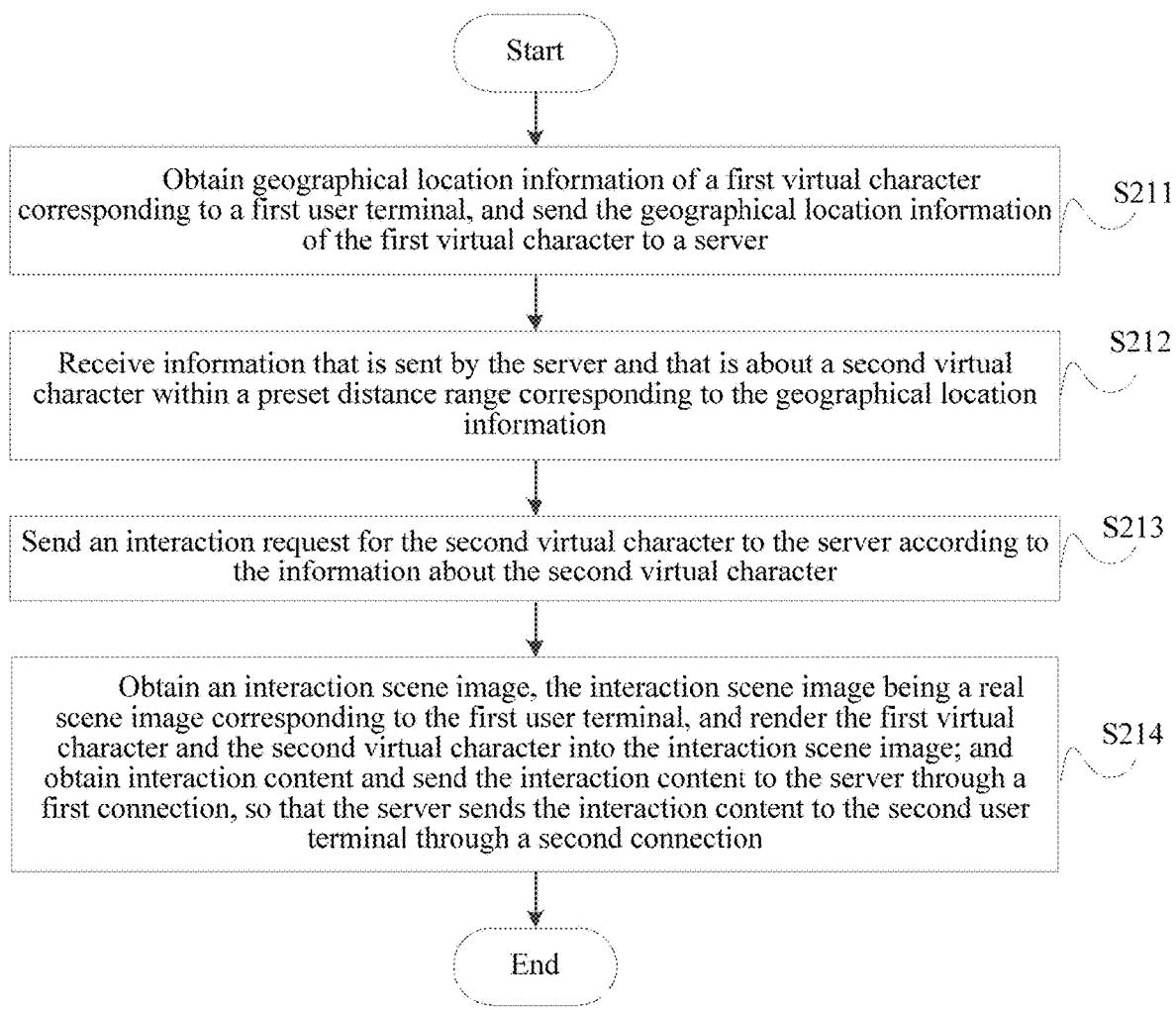
FIG. 2B is a flowchart of an interaction method between user terminals applied to a terminal according to another embodiment of the present invention.
Figure 2C:
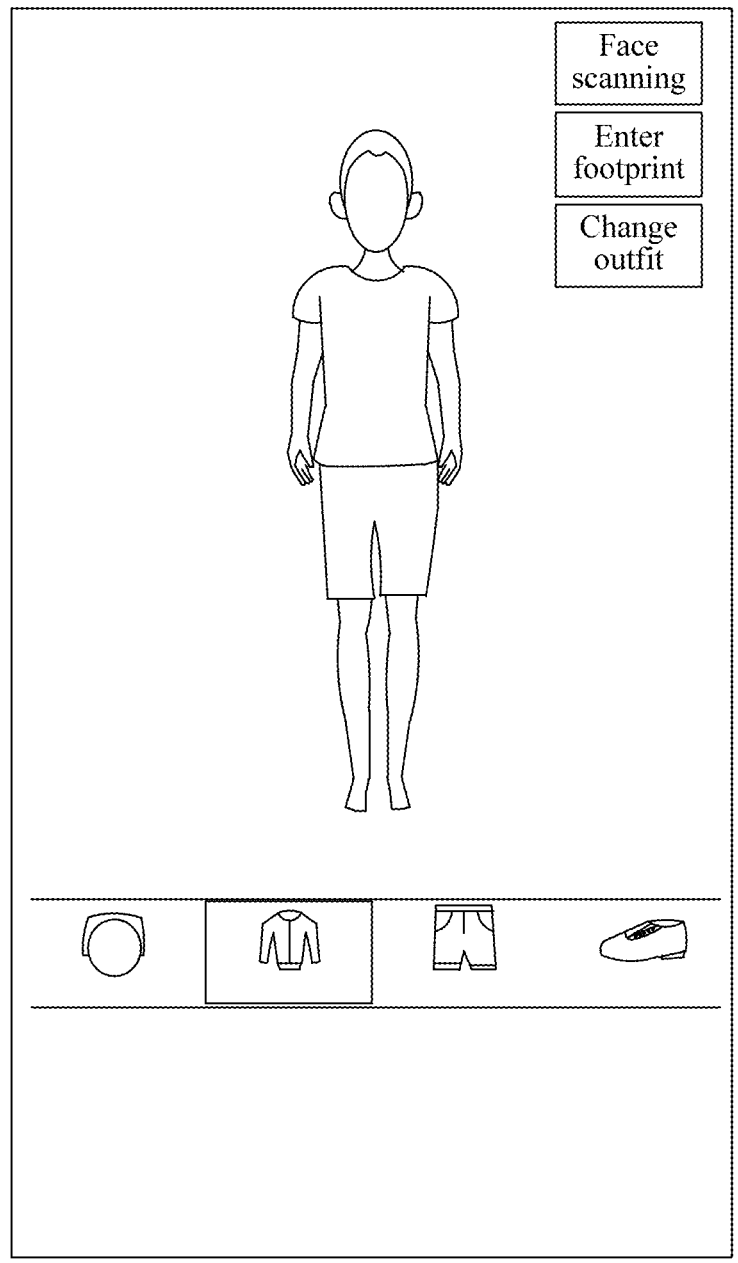
FIG. 2C is a schematic diagram of a decoration interface at a terminal side according to an embodiment of the present invention.
Figure 2D:
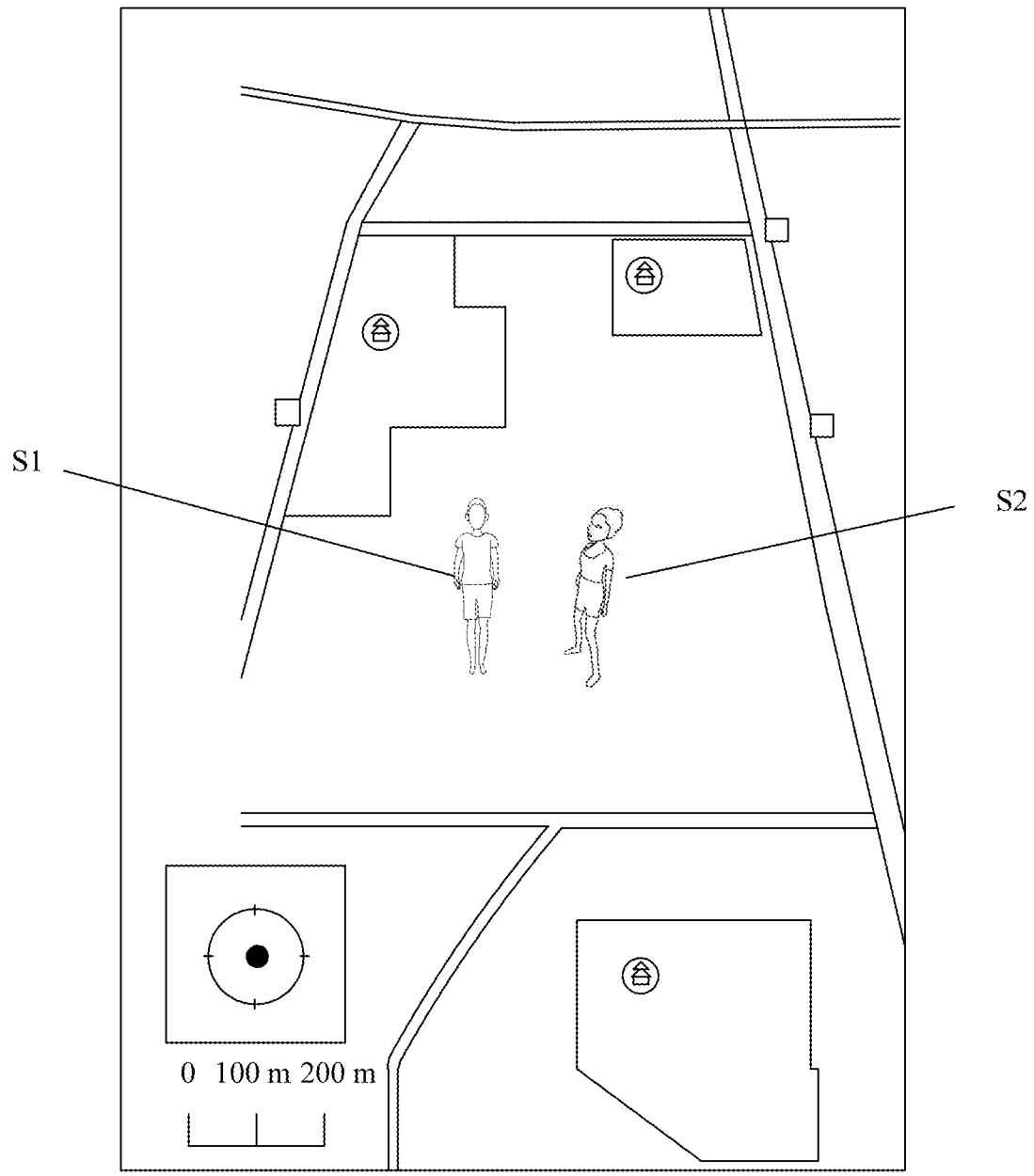
FIG. 2D is a schematic diagram of a rendered interaction scene according to an embodiment of the present invention.
Figure 2E:
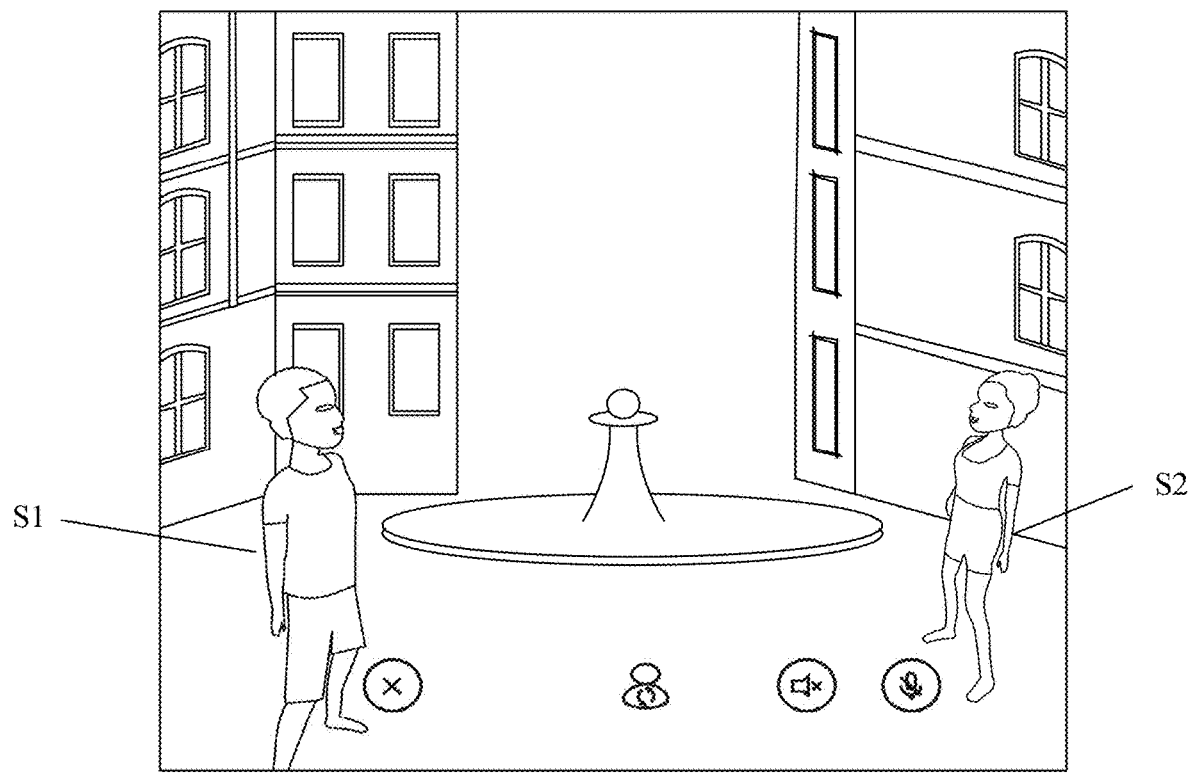
FIG. 2E is a schematic diagram of another rendered interaction scene according to an embodiment of the present invention.
Figure 2F:
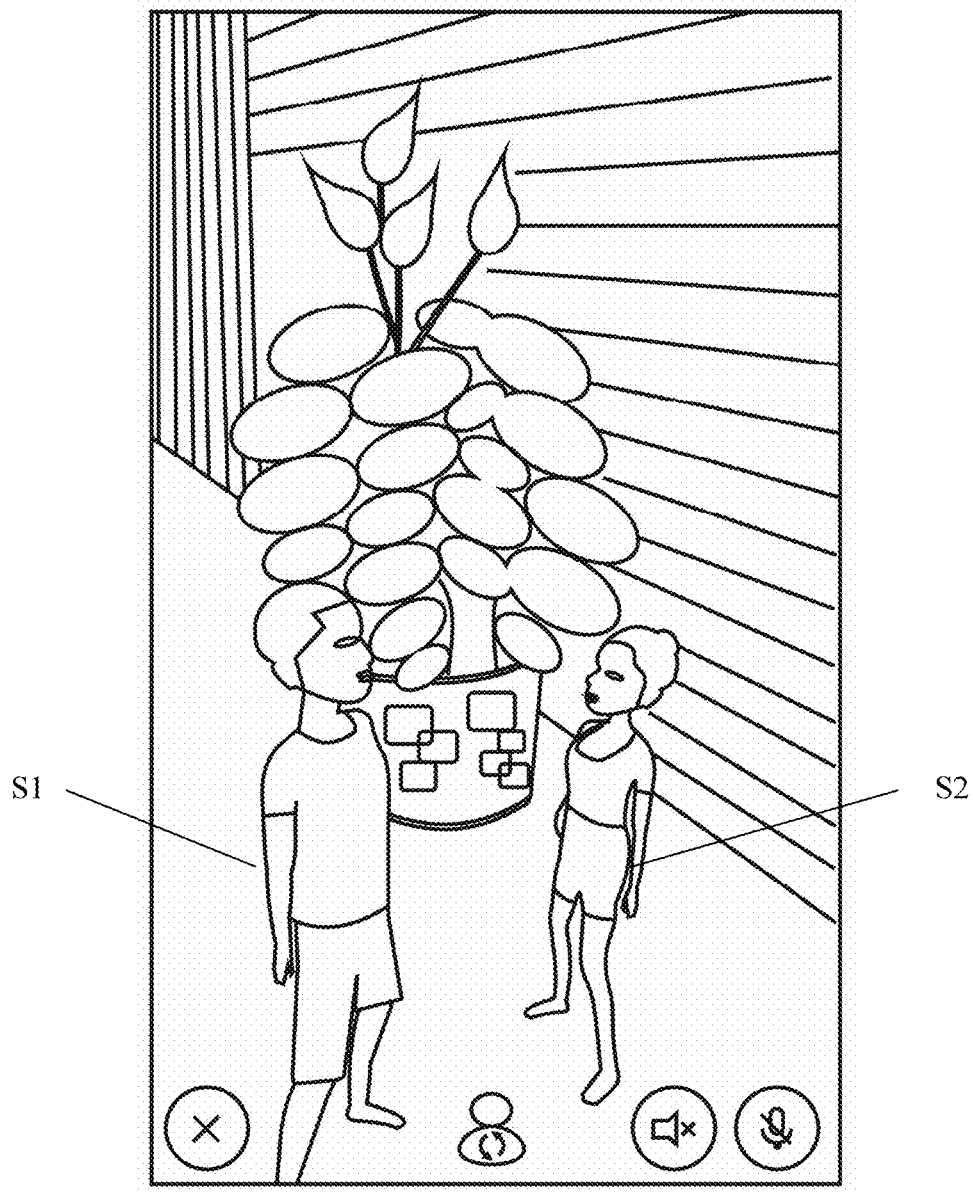
FIG. 2F is a schematic diagram of another rendered interaction scene according to an embodiment of the present invention.

FIG. 2B is a flowchart of an interaction method between user terminals according to an embodiment. The method is applied to the first user terminal 101 in FIG. 1B. As shown in FIG. 2B, the method may include the following steps:

Step S211: Obtain geographical location information of a first virtual character corresponding to the first user terminal, and send the geographical location information of the first virtual character to a server, the server storing a mapping table between a virtual character and geographical location information.

After a user logs into an interaction application on the first user terminal 101, where a map function is also integrated in the interaction application, when the user operates on a map icon in the interaction application, for example, clicks on the map icon to open a map, the interaction application sends the geographical location information of the first virtual character to an interaction platform 103. An interaction application in each terminal may send geographical location information of a virtual character corresponding to each terminal to the interaction platform 103 in response to an operation of a user on a map icon. An interaction server 106 may establish a mapping table of <virtual character, location information> according to the geographical location information of the virtual character reported by each terminal. In the mapping table, a virtual character is an identifier (ID) of the virtual character, and location information is geographical location data corresponding to the virtual character. When the user opens the map, the geographical location data of the virtual character is sent to the interaction platform 103, and the server establishes the mapping table of <virtual character, location information> of the virtual character. When the user exits the map, an exit request is sent to the server, and the server deletes the corresponding mapping table of <virtual character, location information>. In addition, the interaction server 106 further records status information of each virtual character. When the user at the user terminal corresponding to the virtual character opens the map, the interaction server 106 sets a status of the corresponding virtual character to be online, and marks the corresponding virtual character on the map; and when the user exits the map, the interaction server 106 sets the status of the corresponding virtual character to be offline, which indicates that the corresponding virtual character is not on the map. In addition, the interaction server 106 further saves feature data of each virtual character, and the feature data includes the ID of each virtual character, and facial feature data, a facial map, and decoration feature data of the virtual character.

Step S212: Receive information that is sent by the server and that is about a second virtual character within a preset distance range corresponding to the geographical location information.

The interaction server 106 searches for one or more second virtual character located within the preset distance range corresponding to the geographical location information according to the stored mapping table of <virtual character, location information>, and obtains information about the one or more second virtual characters.

Step S213: Send an interaction request for the second virtual character to the server according to the information about the second virtual character, so that the server establishes a first connection to the first user terminal and establishes a second connection to a second user terminal corresponding to the second virtual character.

When the first user terminal sends the geographical location information of the first virtual character to the interaction platform 103 in step S211, a map server 105 obtains corresponding map data according to the geographical location information of the first virtual character, and returns the map data to the first user terminal. In addition, the interaction server 106 sends the information about the one or more second virtual characters obtained through searching to the first user terminal. The interaction application on the first user terminal presents the map according to the map data, and renders the one or more second virtual characters onto the map according to the information about the one or more second virtual characters. The user may select one of the second virtual characters to perform interactions. After the user completes the select operation, the interaction application on the first user terminal sends the first virtual character and an interaction request for the selected second virtual character to the interaction server 106. The interaction server 106 establishes the first connection between the first user terminal and the interaction server 106 and establishes the second connection between the second user terminal corresponding to the second virtual character and the interaction server 106 according to the interaction request. In addition, the user may further select a specific interaction form, and correspondingly, the interaction request carries an identifier of the specific interaction form. The interaction form includes an interaction such as a voice chat or a text chat.

In some embodiments, before establishing the first connection and the second connection, the interaction server 106 determines first whether the selected second virtual character is online; establishes the first connection and the second connection when the second virtual character is online; and directly returns an interaction request failure notification message to the first user terminal when the second virtual character is offline.

Step S214: Obtain an interaction scene image, the interaction scene image being a real scene image corresponding to the first user terminal, and render the first virtual character and the second virtual character into the interaction scene image; and obtain interaction content and send the interaction content to the server through the first connection, so that the server sends the interaction content to the second user terminal through the second connection.

After the interaction application on the first user terminal sends an interaction request to the interaction server 106, the interaction application obtains the interaction scene image, and renders the first virtual character and the second virtual character into the interaction scene image. During subsequent interaction, the first user terminal sends the interaction content to the interaction server 106 through the first connection, and the interaction server 106 sends the interaction content to the second user terminal corresponding to the second virtual character through the second connection.

In this embodiment, the first user terminal may obtain the location information of the first virtual character, sends the location information of the first virtual character to the interaction server on the interaction platform; then receives the information about the second virtual character within the preset distance range of the location indicated by the location information, and sends the interaction request initiated by the first virtual character to the second virtual character, so that the server established the first connection and the second connection. The first user terminal obtains the interaction scene image and renders the first virtual character and the second virtual character into the interaction scene image. The first user terminal sends the interaction content to the interaction server through the first connection, and the interaction server sends the interaction content to the second user terminal corresponding to the second virtual character through the second connection. The virtual characters that perform interactions are rendered into the same interaction scene image, to perform subsequent interactions, so that an application scenario of virtual and physical combination is applied to a social interaction scene.

In some embodiments, the sending the geographical location information of the first virtual character to a server includes:

sending the location information of the first virtual character to the server in response to an operation on a map control, the server obtaining map data corresponding to the geographical location information according to the geographical location information, and the information about the second virtual character including geographical location information of the second virtual character.

The method further includes:

receiving the map data sent by the server, and presenting a corresponding map according to the map data; and rendering the second virtual character on the map according to the geographical location information of the second virtual character.

The sending an interaction request for the second virtual character to the server according to the information about the second virtual character includes:

sending the interaction request initiated by the first virtual character to the second virtual character to the server in response to a selection operation on the second virtual character.

In some embodiments, there is a plurality of second virtual characters, the geographical location information of the second virtual character includes geographical location information of each second virtual character, and the information about the second virtual character further includes feature data of each second virtual character.

The rendering the second virtual character on the map according to the geographical location information of the second virtual character includes:

determining, for any second virtual character, a location of the second virtual character on the map according to the geographical location information of the second virtual character, and rendering the second virtual character on the location according to the feature data of the second virtual character.

The interaction server 106 may determine, according to a value of a preset distance and/or a quantity of the second virtual characters obtained through querying, specific information returned to the terminal. For example, when the preset distance is less than a distance threshold (for example, 50 meters or 100 meters), the information about the second virtual character returned to the terminal includes character location list information (including feature data of each specific second virtual character and location information of each specific second virtual character). For another example, when a quantity of the second virtual characters obtained through searching is less than a quantity threshold (for example, 5 or 10), the information about the second virtual character returned to the terminal includes character location list information (including feature data of each specific second virtual character and location information of each specific second virtual character). When the information about the second virtual character that is received by the terminal and fed back by the interaction server 106 is the character location list information, and the character location list information includes feature data and location data of each second virtual character, for any second virtual character, a location of the second virtual character on the map is determined according to the location data of the second virtual character, and the second virtual character is presented on the location according to the feature data of the second virtual character.

In some embodiments, there is a plurality of second virtual characters, the geographical location information of the second virtual character includes one or more pieces of geographical location information, and the information about the second virtual character further includes a quantity of second virtual characters corresponding to each piece of geographical location information in the one or more pieces of geographical location information.

The rendering the second virtual character on the map according to the geographical location information of the second virtual character includes:

determining, according to any geographical location information in the one or more pieces of geographical location information, a location of the geographical location information on the map, and presenting, at the determined location, an identifier including a quantity of second virtual characters corresponding to the geographical location information;

sending, to the server in response to an operation on any presented identifier, an obtaining request for feature data and geographical location information of each second virtual character corresponding to the identifier;

receiving the feature data and the geographical location information of each second virtual character that are sent by the server; and presenting each second virtual character on the map according to the feature data and the geographical location information of each second virtual character.

The interaction server 106 may determine, according to the value of the preset distance and/or the quantity of the second virtual characters obtained through querying, the specific information returned to the terminal. When the preset distance is greater than or equal to the distance threshold, the information about the second virtual character returned to the first user terminal includes one or more pieces of geographical location information, and the location information is a location at which the plurality of second virtual characters are aggregated. For example, the location is a center location (or referred to as an aggregation location) of the plurality of second virtual characters. In addition, the information about the second virtual character returned to the first user terminal further includes a quantity of second virtual characters corresponding to each piece of geographical location information in the one or more pieces of geographical location information. When the quantity of the second virtual characters obtained through searching is greater than or equal to the quantity threshold, the information about the second virtual character returned to the first user terminal similarly includes one or more pieces of geographical location information and the quantity of second virtual characters corresponding to each piece of geographical location information. When the information about the second virtual character returned to the first user terminal by the interaction server 106 is one or more pieces of geographical location information and the quantity of second virtual characters corresponding to each piece of geographical location information, the first user terminal determines a location of each piece of geographical location information on the map, and presents an identifier at the corresponding location on the map. The identifier includes the quantity of second virtual characters corresponding to the corresponding geographical location information. For example, an aggregation identifier and a quantity of aggregated second virtual characters are presented at a latitude and longitude center on the map. In response to an operation of the user on an identifier, for example, clicking on an identifier by the user, an obtaining request for feature data and location information of each second virtual character corresponding to the identifier is sent to the interaction server 106. The feature data and the location information that are of each second virtual character corresponding to the identifier and that are sent by the interaction server 106 are received, and then each second virtual character is rendered on the map according to the feature data and the location information of each second virtual character.

In some embodiments, the obtaining an interaction scene image includes:

collecting a real scene image in which the first user terminal is located, and using the real scene image as the interaction scene image.

In this embodiment, the interaction scene is a real scene image that is of an environment in which the first user terminal is located and that is captured by the first user terminal by a camera of the first user terminal, and the first virtual character and the second virtual character are rendered into the real scene image captured by the first user terminal. For example, as shown in FIG. 2F, a first virtual character S1 and a second virtual character S2 are rendered into an office scene.

In some embodiments, the obtaining an interaction scene image includes:

receiving an interaction scene image corresponding to the first user terminal and generated by the server according to the interaction request.

In this embodiment, the interaction scene image is provided by the server (the interaction platform 103), and specifically, provided by the map server in the interaction platform 103.

In some embodiments, the interaction scene image is a real scene image corresponding to the location information of the first virtual character corresponding to the first user terminal.

The rendering the first virtual character and the second virtual character into the interaction scene image includes:

rendering the first virtual character and the second virtual character into the real scene image corresponding to the first location information of the first virtual character corresponding to the first user terminal.

In this embodiment, the interaction scene image is provided by the map server 105, the interaction scene image provided by the map server 105 is the real scene image corresponding to the location information of the first virtual character, and the real scene image is the real scene image of the location of the first user terminal. For example, the interaction scene image may be blending presentation of the virtual characters and a map. For example, as shown in FIG. 2D, a first virtual character S1 and a selected second virtual character S2 are rendered onto a map image around the first user terminal. Alternatively, the interaction scene image may be blending presentation of the virtual characters and a streetscape. For example, as shown in FIG. 2E, a first virtual character S1 and a second virtual character S2 are rendered into a streetscape image between two buildings.

In some embodiments, the interaction request carries designated location information corresponding to the first user terminal, and the interaction scene image is a real scene image of a location corresponding to the designated location information.

The rendering the first virtual character and the second virtual character into the interaction scene image includes:

rendering the first virtual character and the second virtual character into the real scene image of the location corresponding to the designated location information.

The interaction request may alternatively be a location traversal interaction request, the interaction request may carry designated location information, and a location indicated by the designated location information, for example, may be a location after traversal. Correspondingly, the generated interaction scene may be a real scene image corresponding to the location indicated by the designated location information. The designated location may be any location on the map, or the designated location may be a location having a streetscape on the map. The real scene image corresponding to the designated location information may be a map image, or a streetscape image.

In some embodiments, feature data of the virtual character includes facial feature data, a facial map, and decoration data.

Before the sending the geographical location information of the first virtual character to a server, the method further includes:

obtaining facial feature data and a facial map of the first virtual character in response to a scanning operation of a user on a face, and obtaining decoration data of the first virtual character in response to selection of a decoration element identifier; and sending a virtual character creation request to the server, the request carrying the facial feature data, the facial map, and the decoration data of the first virtual character.

In this embodiment, the user may create the first virtual character on the interaction application on the first terminal. The interaction application on the first terminal obtains the facial feature data of the first virtual character in response to the scanning operation of the user on the face, and obtains the decoration data of the first virtual character in response to the selection of the decoration element identifier. The interaction application of the first terminal sends the feature data of the created first virtual character to the interaction server 106 on the interaction platform 103, and specifically, sends the virtual character creation request to the interaction server 106. The virtual character creation request carries an identifier ID of the first virtual character and the feature data of the first virtual character. The feature data of the first virtual character includes the facial feature data, the facial map, and the decoration data.

In some embodiments, the interaction method between user terminals provided in this application further includes:

receiving an update notification message of the second virtual character sent by the server; and updating the second virtual character according to the update notification message.

In this embodiment, when receiving the update notification message of the second virtual character, the second virtual character may be one of the plurality of second virtual characters on the map presented on the first user terminal, or may be a second virtual character rendered onto the interaction scene image. The update notification message, for example, may instruct to update the feature data of the second virtual character, for example, facial feature data, a facial map, or decoration data, or update location data of the second virtual character, or update a status of the second virtual character. For example, when the status of the second virtual character is updated to an offline state, the second virtual character presented on the corresponding map disappears from the map, and the second virtual character presented in the interaction scene image disappears from the interaction scene image. When receiving the update message, the first user terminal performs a corresponding update operation on the corresponding second virtual character according to the update message.

Figure 3A:
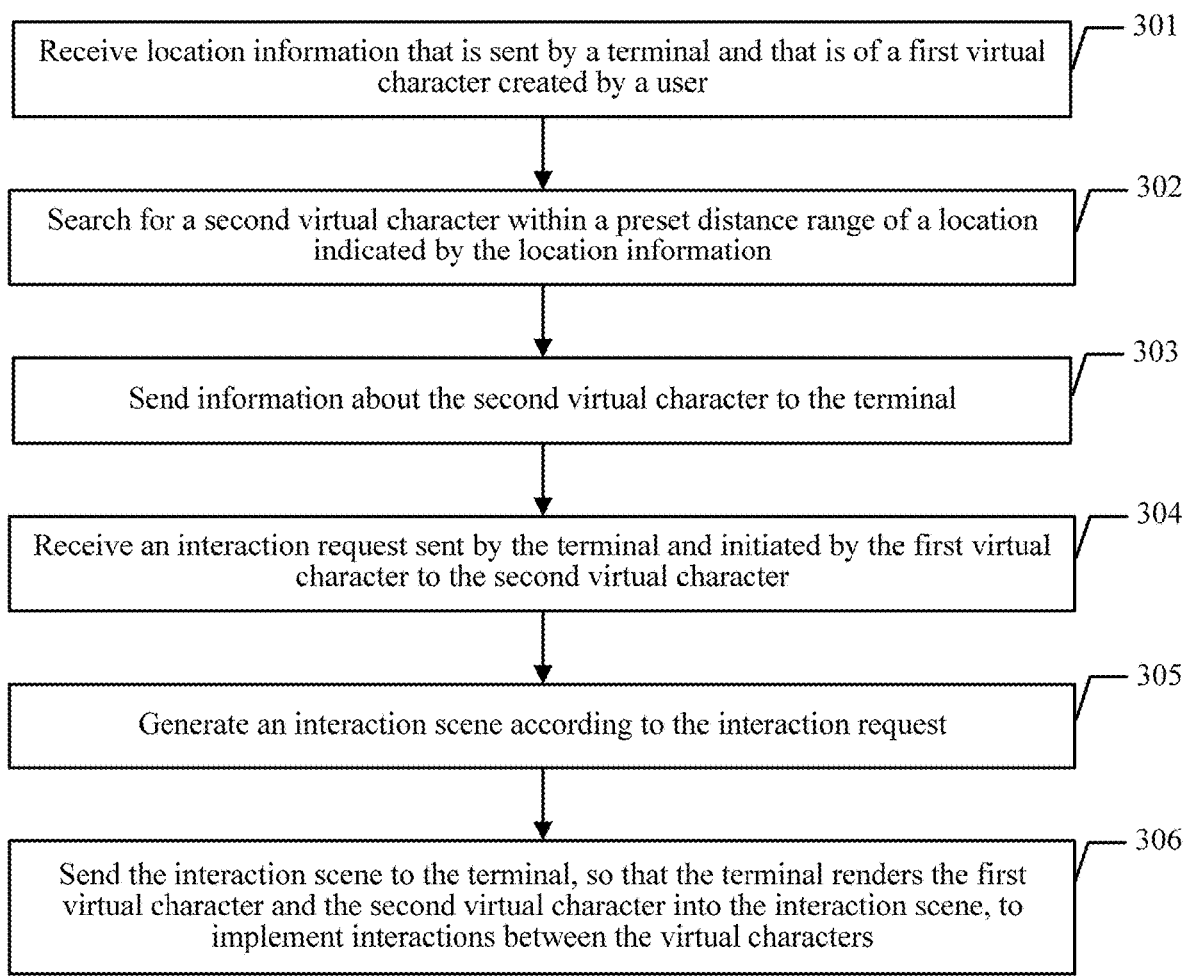
FIG. 3A is another schematic flowchart of an interaction method between virtual characters according to an embodiment of the present invention.

An embodiment shown in FIG. 3A describes an interaction method for augmented reality according to an embodiment from a perspective a server. The method may be applied to the server in FIG. 1A. As shown in FIG. 3A, the method may include the following steps:

Step S301: Receive location information that is sent by a terminal and that is of a first virtual character created by a user.

For a specific process of creating a virtual character, refer to descriptions in the foregoing embodiments. Details are not described herein again.

After a user of each terminal creates a virtual character on the terminal, the corresponding terminal may obtain location information of the virtual character created by the user. The location information may be location information of the terminal, or may be location information after the corresponding virtual character performs a location traversal. The location information may be latitude and longitude values or geographical coordinates values. After obtaining the location information, each terminal may send the virtual character created by the user and the location information of the virtual character to a server. The server may also set some virtual characters and set location information for these virtual characters. The server may establish a mapping table of <virtual character, location information> according to virtual character information reported by each terminal and virtual character information set by the server, and save the established mapping table into a database.

For ease of description, in this embodiment, the virtual character created by the user of the terminal may be referred to as the first virtual character, and another virtual character may be referred to as a second virtual character. The second virtual character may be created by a user of another terminal (the another terminal may control the virtual character, for example, change a location of the virtual character, replace a decoration of the virtual character, or change an online/offline state of the virtual character), or may be set by the server (the server may control the virtual character). When the first virtual character desires to interact with the second virtual character, the terminal may send the location information of the first virtual character to the server. The server receives the location information of the first virtual character sent by the terminal, and the server may further receive preset distance information sent by the terminal. A preset distance may be user-defined according to an actual need, for example, may be 40 meters, or 80 meters.

Step S302: Search for a second virtual character within a preset distance range of a location indicated by the location information.

After receiving the location information and the preset distance information, the server may query, according to a correspondence between a virtual character and location information, that is, the mapping table stored in the database, for the second virtual character within the preset distance range of the location indicated by the location information. There may be a plurality of second virtual characters obtained through querying, and the sever sends information about the second virtual characters obtained through querying to the terminal.

Step S303: Send information about the second virtual character to the terminal.

Specifically, the server may determine, according to a value of the preset distance and/or a quantity of the second virtual characters obtained through querying, specific information sent to the terminal. For example, when the preset distance is less than a distance threshold (for example, 50 meters or 100 meters), character location list information (including each specific second virtual character and location information of each specific second virtual character) of the second virtual characters may be sent to the terminal; and when the preset distance is greater than or equal to the distance threshold, location quantity aggregation information (which may include only a quantity of second virtual characters aggregated at each location and does not include specific virtual character information) of the second virtual characters may be sent to the terminal. For example, aggregation may be performed by using <latitude and longitude center, quantity>. For another example, when a quantity of the second virtual characters obtained through searching is less than a quantity threshold (for example, 5 or 10), character location list information (including each specific second virtual character and location information of each specific second virtual character) of the second virtual characters may be sent to the terminal; and when the quantity of the second virtual characters obtained through searching is greater than or equal to the quantity threshold, location quantity aggregation information (which may include only a quantity of second virtual characters aggregated at each location and does not include specific virtual character information) of the second virtual characters may be sent to the terminal.

If information fed back by the server and received by the terminal is the location quantity aggregation information of the second virtual characters, the terminal may obtain each specific second virtual character aggregated at a certain location and detailed location information according to an operation of the user (for example, clicking on the aggregation location).

Then, the user may select a second virtual character from the plurality of second virtual characters, and the terminal determines the second virtual character selected by the user. The terminal obtains an interaction request initiated by the first virtual character to the second virtual character selected by the user, and sends the interaction request to the server.

Step S304: Receive an interaction request sent by the terminal and initiated by the first virtual character to the second virtual character.

That is, the server receives the interaction request initiated by the first virtual character to the second virtual character selected by the user. The server may determine, according to a maintained online state of each virtual character, whether the second virtual character selected by the user is online; directly return a request failure notification message to the terminal if the second virtual character is offline; and generate the interaction scene according to the interaction request if the second virtual character is online.

Step S305: Generate an interaction scene according to the interaction request.

In a specific implementation, the interaction request may be a chat interaction request (for example, an interaction such as a voice chat, a video chat, or a text chat). Correspondingly, the generated interaction scene may be a real scene image corresponding to the location information of the first virtual character by default. The real scene image may be a map image corresponding to the location information, or a streetscape image corresponding to the location information, or a real scene image corresponding to the location information.

Alternatively, the interaction request may be a location traversal interaction request. The interaction request may include designated location information. Correspondingly, the generated interaction scene may be a real scene image corresponding to the designated location information. A designated location may be any location on a map, or the designated location may be any location having a streetscape on the map. The real scene image corresponding to the designated location information may be a map image, or may be a streetscape image.

Step S306: Send the interaction scene to the terminal, so that the terminal renders the first virtual character and the second virtual character into the interaction scene, to implement interactions between the virtual characters.

Then, when a virtual character created by a user of a certain terminal has an update (including an update of the virtual character, and/or an update of location information, and/or an online/offline state update), the terminal sends an update notification message to the server. The server updates, according to the update notification message, data stored in the database, and then sends the update notification message to another terminal which displays the virtual character, to instruct the another terminal to update the displayed corresponding virtual character.

In this embodiment, after receiving the location information that is sent by the terminal and that is of the first virtual character created by the user, the server searches for the second virtual character within the preset distance range of the location indicated by the location information, and sends the information about the second virtual character to the terminal; after receiving the interaction request sent by the terminal and initiated by the first virtual character to the second virtual character, generates the interaction scene according to the interaction request; and sends the interaction scene to the terminal, so that the terminal renders the first virtual character and the second virtual character into the interaction scene. That is, the terminal renders different virtual characters into a same real interaction scene, thereby implementing interactions between the virtual characters, and expanding an application scenario of technologies related to virtual and physical combination.

Figure 3B:
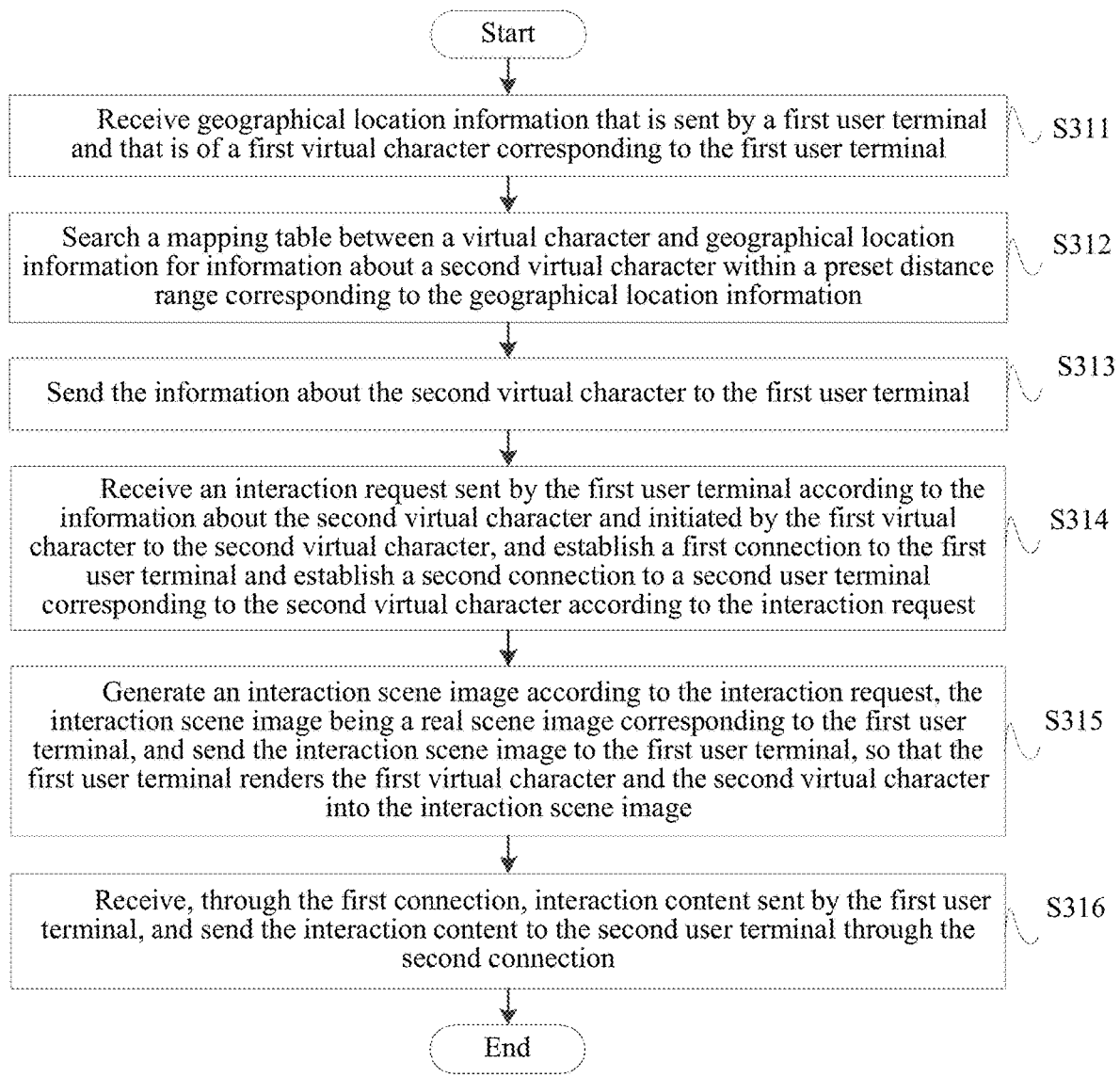
FIG. 3B is a flowchart of an interaction method between user terminals applied to a server according to another embodiment of the present invention.

An embodiment of this application further provides an interaction method between user terminals. The method may be applied to the interaction platform in FIG. 1B. As shown in FIG. 3B, the method includes the following steps:

Step S311: Receive geographical location information that is sent by a first user terminal and that is of a first virtual character corresponding to the first user terminal.

Step S312: Search a mapping table between a virtual character and geographical location information for information about a second virtual character within a preset distance range corresponding to the geographical location information.

Step S313: Send the information about the second virtual character to the first user terminal.

Step S314: Receive an interaction request sent by the first user terminal according to the information about the second virtual character and initiated by the first virtual character to the second virtual character, and establish a first connection to the first user terminal and establish a second connection to a second user terminal corresponding to the second virtual character according to the interaction request.

Step S315: Generate an interaction scene image according to the interaction request, the interaction scene image being a real scene image corresponding to the first user terminal, and send the interaction scene image to the first user terminal, so that the first user terminal renders the first virtual character and the second virtual character into the interaction scene image.

Step S316: Receive, through the first connection, interaction content sent by the first user terminal, and send the interaction content to the second user terminal through the second connection.

The steps of the interaction method between user terminals used at a server side according to this application are the same as the steps of the interaction method between user terminals at a user terminal side in FIG. 2A. Details are not described herein again.

Figure 4:
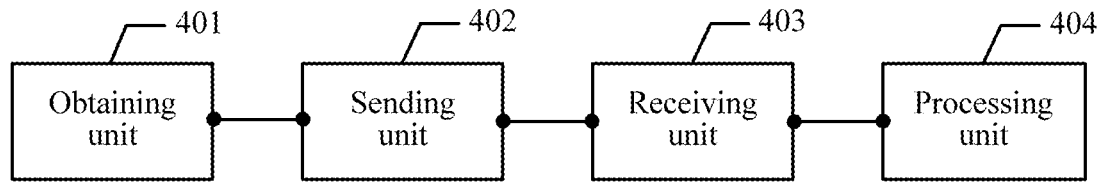
FIG. 4 is a schematic structural diagram of a terminal according to an embodiment of the present invention.

To better implement the method described in Embodiment 1, an embodiment further provides a terminal. As shown in FIG. 4, the terminal includes an obtaining unit 401, a sending unit 402, a receiving unit 403, and a processing unit 404. These units may be implemented in hardware using, for example, a processor, memory and transceiver (transmitter and receiver).

The obtaining unit 401 is configured to obtain location information of a first virtual character created by a user.

The sending unit 402 is configured to send the location information of the first virtual character to a server.

The receiving unit 403 is configured to receive information about a second virtual character within a preset distance range of a location indicated by the location information.

The obtaining unit 401 is further configured to obtain an interaction request initiated by the first virtual character to a second virtual character selected by the user.

The sending unit 402 is further configured to send the interaction request to the server.

The receiving unit 403 is further configured to receive an interaction scene generated by the server according to the interaction request.

The processing unit 404 is configured to render the first virtual character and the second virtual character into the interaction scene, to implement interactions between the virtual characters.

In this embodiment, the obtaining unit may obtain the location information of the first virtual character created by the user, and the sending unit sends the location information of the first virtual character to the server; then the receiving unit receives the information about the second virtual character within the preset distance range of the location indicated by the location information, and the obtaining units obtains the interaction request initiated by the first virtual character to the second virtual character; and the receiving unit receives the interaction scene generated by the server according to the interaction request, and the processing unit renders the first virtual character and the second virtual character into the interaction scene. According to this embodiment, the terminal renders different virtual characters into a same real interaction scene, thereby implementing interactions between the virtual characters, and expanding an application scenario of technologies related to virtual and physical combination.

In some embodiments, the obtaining unit 401, the sending unit 402, the receiving unit 403, and the processing unit 404 may be configured to implement corresponding steps of the method embodiments of this application. For specific functions of the units, refer to the foregoing method embodiments. Details are not described herein again.

Figure 5:
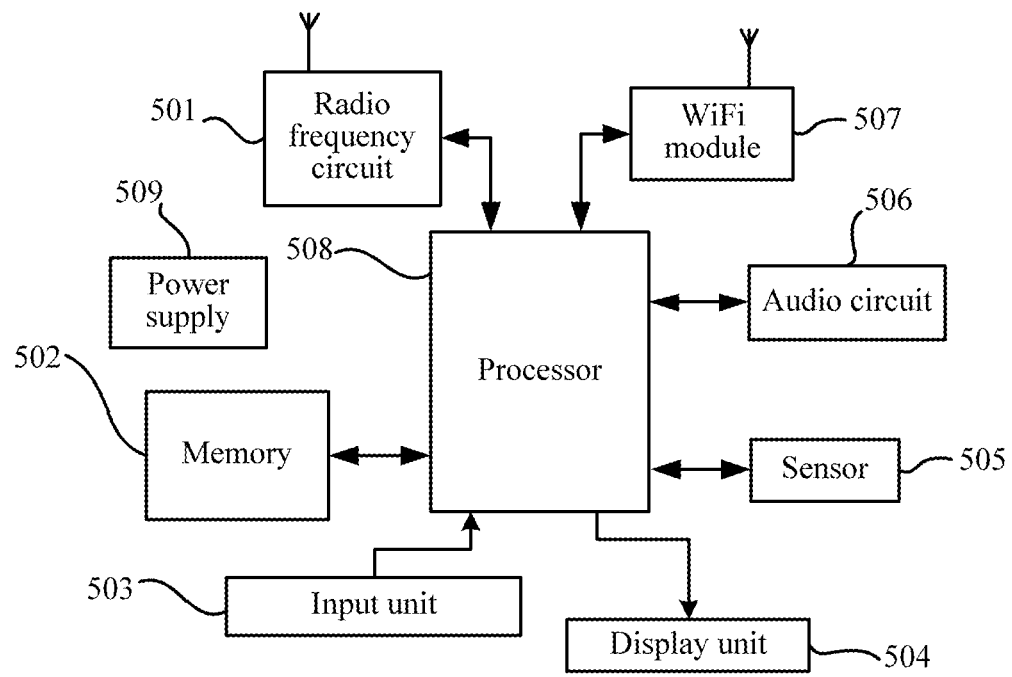
FIG. 5 is another schematic structural diagram of a terminal according to an embodiment of the present invention.

An embodiment further provides a terminal. FIG. 5 is a schematic structural diagram of the terminal according to this embodiment. The terminal may include components such as a radio frequency (RF) circuit 501, a memory 502 including one or more computer readable storage media, an input unit 503 (i.e., input interface), a display unit 504, a sensor 505 an audio circuit 506 (i.e., audio interface), a wireless fidelity (WiFi) module 507, a processor 508 including one or more processing cores, and a power supply 509. Persons skilled in the technology will understand that the structure of the terminal shown in FIG. 5 does not constitute a limitation to the terminal, and the terminal may include more or fewer components than those shown in the figure, or some components may be combined, or a different component deployment may be used.

The RF circuit 501 may be configured to receive and send signals during information receiving and sending or during a call. Particularly, the RF circuit 501 receives downlink information from a base station, then delivers the downlink information to one or more processors 508 for processing, and sends related uplink data to the base station. Generally, the RF circuit 501 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 501 may also communicate with a network and another device by wireless communication. The wireless communication may use any communications standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), an e-mail, a Short Message Service (SMS), and the like.

The memory 502 may be configured to store a software program and a module. The processor 508 runs the software program and the module stored in the memory 502, to perform various functional applications and data processing. The memory 502 may include a program storage area and a data storage area. The program storage area may store an operating system, an application program required by at least one function (such as a sound playback function and an image display function), and the like. The data storage area may store data (such as audio data and a phone book) created according to use of the terminal, and the like. In addition, the memory 502 may include a high speed random access memory, and may further include a non-volatile memory, such as at least one magnetic disk storage device, a flash memory, or another volatile solid-state storage device. Correspondingly, the memory 502 may further include a memory controller, to provide access of the processor 508 and the input unit 503 to the memory 502.

The input unit 503 may be configured to receive input digit or character information, and generate keyboard, mouse, joystick, optical or track ball signal input related to the user setting and function control. Specifically, in a specific embodiment, the input unit 503 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection terminal according to a preset program. Optionally, the touch-sensitive surface may include two parts: a touch detection terminal and a touch controller. The touch detection terminal detects a touch position of the user, detects a signal generated by the touch operation, and transfers the signal to the touch controller. The touch controller receives the touch information from the touch detection terminal, converts the touch information into touch point coordinates, and sends the touch point coordinates to the processor 508. Moreover, the touch controller can receive and execute a command sent by the processor 508. In addition, the touch-sensitive surface may be implemented in multiple types, such as a resistive type, a capacitive type, an infrared type, and a surface acoustic wave type. In addition to the touch-sensitive surface, the input unit 503 may further include another input device. Specifically, the another input device may include but is not limited to one or more of a physical keyboard, a function key (for example, a volume control key or a power on/off key), a trackball, a mouse, or a joystick.

The display unit 504 may be configured to display information input by the user or information provided for the user, and various graphical user interfaces of the terminal. The graphical user interfaces may be composed of graphics, text, icons, videos, and any combination thereof. The display unit 504 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfer the touch operation to the processor 508 to determine a type of a touch event, and then the processor 508 provides corresponding visual output on the display panel according to the type of the touch event. Although in FIG. 5, the touch-sensitive surface and the display panel are used as two separate parts to implement input and output functions, in some embodiments, the touch-sensitive surface and the display panel may be integrated to implement the input and output functions.

The terminal may further include at least one sensor 505 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to the ear. As one type of the motion sensor, a gravity acceleration sensor may detect a value of acceleration in each direction (which generally is triaxial), may detect a value and a direction of the gravity when being static, and may be configured to identify an application of a terminal gesture (such as a handover between horizontal and longitudinal screens, a related game, and magnetometer gesture calibration), a function related to vibration identification (such as a pedometer and a knock), and the like. Another sensor, such as a gyroscope, a barometer, a hygrometer, a thermometer, and an infrared sensor, which can be configured in the terminal is not described herein again.

The audio circuit 506, a speaker, and a microphone may provide audio interfaces between the user and the terminal. The audio circuit 506 may convert received audio data into an electric signal and transmit the electric signal to the speaker. The speaker converts the electric signal into a sound signal for output. On the other hand, the microphone converts a collected sound signal into an electric signal. The audio circuit 560 receives the electric signal and converts the electric signal into audio data, and outputs the audio data to the processor 508 for processing. Then, the processor 508 sends the audio data to, for example, another terminal by using the RF circuit 501, or outputs the audio data to the memory 502 for further processing. The audio circuit 506 may further include an earplug jack, to provide communication between a peripheral earphone and the terminal.

WiFi is a short distance wireless transmission technology. The terminal may help, by using the WiFi module 507, the user to receive and send emails, browse a web page, access streaming media, and so on, which provides wireless broadband Internet access for the user. Although FIG. 5 shows the WiFi circuit 507, it may be understood that the WiFi circuit 507 is not a necessary component of the terminal, and when required, the WiFi circuit 507 may be omitted as long as the scope of the essence of the present disclosure is not changed.

The processor 508 is the control center of the terminal, and is connected to various parts of the entire terminal by using various interfaces and wires. By running or executing the software program and/or module stored in the memory 502, and invoking data stored in the memory 502, the processor 508 performs various functions and data processing of the terminal, thereby performing overall monitoring on the terminal. Optionally, the processor 508 may include one or more processing cores; and the processor 508 may integrate an application processor and a modem, where the application processor processes an operating system, a user interface, an application program and the like, and the modem processes wireless communication. It may be understood that the foregoing modem may alternatively not be integrated into the processor 508.

The terminal further includes the power supply 509 (such as a battery) for supplying power to the components. The power supply may be logically connected to the processor 508 by using a power management system, thereby implementing functions such as charging, discharging, and power consumption management by using the power management system. The power supply 509 may further include one or more of a direct current or alternating current power supply, a re-charging system, a power failure detection circuit, a power supply converter or inverter, a power supply state indicator, and any other components.

Although not shown in the figure, the terminal may further include a camera, a Bluetooth module, and the like. Details are not described herein. Specifically, in this embodiment, the processor 508 of the terminal may load, according to the following instructions, executable files corresponding to processes of one or more application programs into the memory 502. The processor 508 runs the application programs stored in the memory 502, to implement various functions of the foregoing interaction method between user terminals that is applied to a terminal side.

Figure 6:
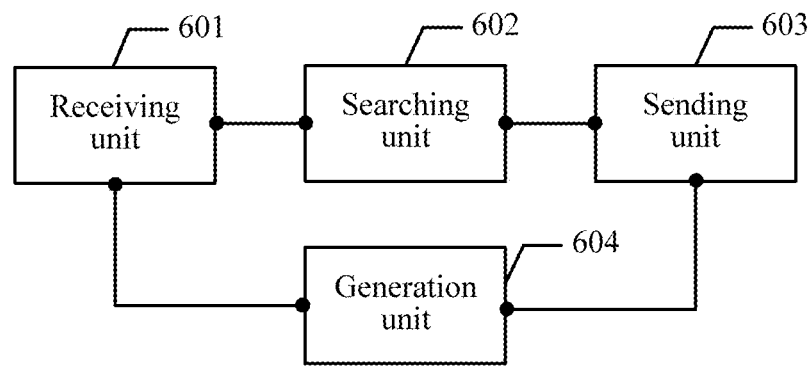
FIG. 6 is a schematic structural diagram of a server according to an embodiment of the present invention.

An embodiment further provides a server. As shown in FIG. 6, the server includes a receiving unit 601, a searching unit 602, a sending unit 603, and a generation unit 604.

The receiving unit 601 is configured to receive location information that is sent by a terminal and that is of a first virtual character created by a user.

The searching unit 602 is configured to search for a second virtual character within a preset distance range of a location indicated by the location information.

The sending unit 603 is configured to send information about the second virtual character to the terminal.

The generation unit 604 is configured to generate an interaction scene according to an interaction request.

In some embodiments, the receiving unit 601, the searching unit 602, the sending unit 603, and the generation unit 604 may be configured to implement corresponding steps of the method embodiments of this application. For specific functions of the units, refer to the foregoing method embodiments. Details are not described herein again.

In this embodiment, after the receiving unit receives the location information that is sent by the terminal and that is of the first virtual character created by the user, the searching unit searches for the second virtual character within the preset distance range of the location indicated by the location information, and the sending unit sends the information about the second virtual character to the terminal; after the receiving unit receives the interaction request sent by the terminal and initiated by the first virtual character to the second virtual character, the generation unit generates the interaction scene according to the interaction request; and the sending unit sends the interaction scene to the terminal, so that the terminal renders the first virtual character and the second virtual character into the interaction scene. That is, the terminal in this embodiment may render different virtual characters into a same real interaction scene, thereby implementing interactions between the virtual characters, and expanding an application scenario of technologies related to virtual and physical combination.

Figure 7:
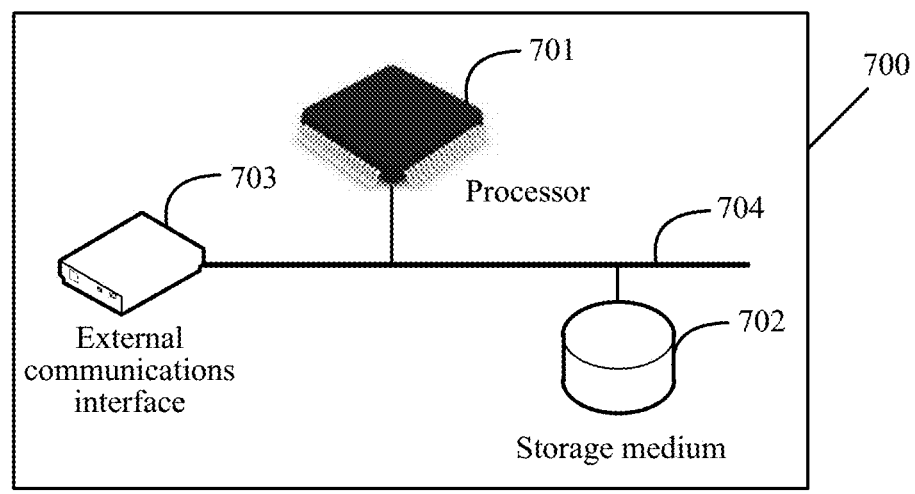
FIG. 7 is another schematic structural diagram of a server according to an embodiment of the present invention.

An embodiment further provides a server. As shown in FIG. 7, the server may be composed by using a cluster system, and may be a combined electronic device for implementing functions of various units or electronic devices separately disposed for implementing the functions of various units. The server includes at least a database configured to store data and a processor configured to process data, or includes a storage medium disposed in an identification server or a storage medium disposed independently.

When performing processing, the processor configured to process data may be implemented by using a microprocessor, a central processing unit (CPU), a digital signal processor (DSP), or a field programmable gate array (FPGA). The storage medium may include operating instructions, the operating instructions may be computer executable code, and steps in the interaction method between user terminals that is applied to a server side according to an embodiment are implemented by using the operating instructions.

An example of the server as a hardware entity 700 is shown in FIG. 7, including a processor 701, a storage medium 702, and at least one external communications interface 703. The processor 701, the storage medium 702, and the external communications interface 703 are connected by using a bus 704.

It should be noted that the foregoing descriptions related to the server are similar as the descriptions of the corresponding method. Details are not described herein. For technical details that are not disclosed in the server embodiment, refer to descriptions of the method embodiments.

At last, an embodiment further provides an interaction system between virtual characters, including a terminal and a server. The terminal may be the terminal described above, and the server may be the server described above. For a specific interaction process, refer to the foregoing descriptions. Details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit. When the integrated unit is implemented in the form of a software functional unit and sold or used as an independent product, the integrated unit may be stored in a computer readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, an apparatus, or a network device) to perform all or some of the steps of the methods described in the embodiments. The foregoing storage medium includes: any medium that can store program code, such as a USB flash memory drive, a removable hard disk, a read-only memory (ROM), a random access memory (RAM), a magnetic disk, or an optical disc.

The foregoing embodiments are provided to describe the embodiments, and are not intended to limit the present disclosure. Although the embodiments are described in detail with reference to the foregoing embodiments, persons of ordinary skill in the art should understand that modifications may be made to the described embodiments or make equivalent substitutions to some technical features thereof, without departing from the spirit and scope of the present disclosure.

What is claimed is:

1. A method performed by one or more processors of a first user terminal, the method comprising: before sending geographical location information of a first virtual character to a server:
    obtaining facial feature data, in response to a facial scanning operation of an end user;
    obtaining decoration data, in response to a selection by the end user;
    blending the obtained facial feature data and the obtained decoration data with one or more corresponding facial features of a preset virtual character model to generate the first virtual character; and
    sending a virtual character creation request to the server, the virtual character creation request comprising data of the generated first virtual character;
    obtaining the geographical location information of the first virtual character corresponding to the first user terminal;
    sending the obtained geographical location information of the first virtual character to the server, the server storing information identifying the first virtual character and the geographical location information of the first virtual character in a mapping table;
    receiving, from the server, information identifying a second virtual character within a range of the sent geographical location information of the first virtual character;
    sending, to the server, an interaction request for the second virtual character, based on the received information identifying the second virtual character, the interaction request causing the server to establish a first connection to the first user terminal and a second connection to a second user terminal corresponding to the second virtual character;
    obtaining an interaction scene image, the interaction scene image being a real scene image corresponding to the first user terminal;
    rendering the first virtual character and the identified second virtual character into the obtained interaction scene image;
    obtaining interaction content; and
    sending the obtained interaction content to the server through the established first connection, the interaction content causing the server to send the interaction content to the second user terminal through the established second connection.

2. The method according to claim 1, wherein the sending the geographical location information of the first virtual character to a server comprises sending the geographical location information of the first virtual character to the server in response to an operation on a map control, wherein the information about the second virtual character comprises geographical location information of the second virtual character,
    wherein the method further comprises:
        receiving map data corresponding to the geographical location information of the first virtual character from the server;
        presenting a map according to the map data; and
        rendering the second virtual character on the map according to the geographical location information of the second virtual character, and
    wherein the sending the interaction request for the second virtual character to the server according to the information about the second virtual character comprises sending the interaction request initiated by the first virtual character to the second virtual character via the server in response to a selection operation on the second virtual character on the map.

3. The method according to claim 2, wherein the second virtual character is one of a plurality of second virtual characters, wherein the geographical location information of the second virtual character comprises geographical location information and feature data of each of the plurality of second virtual characters, and
    wherein the rendering the second virtual character on the map according to the geographical location information of the second virtual character comprises:
        determining, for each of the plurality of second virtual characters, a corresponding location according to corresponding geographical location information of each of the plurality of second virtual characters; and
        rendering each of the plurality of second virtual characters on the corresponding location.

4. The method according to claim 2, wherein the second virtual character is one of a plurality of second virtual characters, wherein the geographical location information of the second virtual character comprises one or more pieces of geographical location information and a quantity of second virtual characters corresponding to each of the one or more pieces of geographical location information, and
    wherein the rendering the second virtual character on the map according to the geographical location information of the second virtual character comprises:
        determining, according to each of the one or more pieces of geographical location information, a corresponding location on the map;
        presenting, at the corresponding location, an identifier indicating a quantity of second virtual characters corresponding to the corresponding location;
        sending, to the server in response to an operation on the identifier, a request for feature data and geographical location information of each second virtual character corresponding to the identifier;
        receiving the feature data and the geographical location information of each second virtual character corresponding to the identifier from the server; and
        presenting each second virtual character corresponding to the identifier on the map according to the feature data and the geographical location information received from the server.

5. The method according to claim 1, wherein the obtaining the interaction scene image comprises capturing the real scene image in which the first user terminal is located using a camera of the first user terminal.

6. The method according to claim 1, wherein the obtaining the interaction scene image comprises receiving the interaction scene image from the server according to the interaction request.

7. The method according to claim 6, wherein the real scene image corresponds to the geographical location information of the first virtual character, and wherein the rendering the first virtual character and the second virtual character into the interaction scene image comprises rendering the first virtual character and the second virtual character into the real scene image corresponding to the geographical location information of the first virtual character.

8. The method according to claim 6, wherein the interaction request comprises designated location information corresponding to the first user terminal, and the real scene image corresponds to the designated location information, and wherein the rendering the first virtual character and the second virtual character into the interaction scene image comprises rendering the first virtual character and the second virtual character into the real scene image of a location corresponding to the designated location information.

9. The method according to claim 1, further comprising: receiving an update notification message from the server, the update notification message being used for notifying a user of the selected second virtual character being updated; and
updating the second virtual character according to the update notification message.

10. A system comprising: first user terminal, the first user terminal comprising:
at least one memory operable to store program code; and
at least one processor operable to read the program code, and operate as instructed by the program code to control the first user terminal to:
before sending geographical location information of a first virtual character to a server:
obtain facial feature data, in response to a facial scan operation of an end user; and
obtain decoration data, in response to a selection by the end user;
blend the obtained facial feature data and the obtained decoration data with one or more corresponding facial features of a preset virtual character model to generate the first virtual character; and
send a virtual character creation request to the server, the virtual character creation request comprising data of the generated first virtual character;
obtain the geographical location information of the first virtual character corresponding to the first user terminal;
send the obtained geographical location information of the first virtual character to the server, the server storing information identifying the first virtual character and the geographical location information of the first virtual character in a mapping table;
receive, from the server, information identifying a second virtual character within a range of the sent geographical location information of the first virtual character,
send, to the server, an interaction request for the second virtual character, based on the received information identifying the second virtual character, the interaction request causing the server to establish a first connection to the first user terminal and a second connection to a second user terminal corresponding to the second virtual character;

obtain an interaction scene image, the interaction scene image being a real scene image corresponding to the first user terminal;
render the first virtual character and the identified second virtual character into the obtained interaction scene image;
obtain interaction content; and
send the obtained interaction content to the server through the established first connection, the interaction content causing the server to send the interaction content to the second user terminal through the established second connection.

11. The system according to claim 10, wherein the information about the second virtual character comprises geographical location information of the second virtual character, and wherein the at least one processor is further operable to read the program code, and operate as instructed by the program code to control the first user terminal to:
send the geographical location information of the first virtual character to the server in response to an operation on a map control;
receive map data corresponding to the geographical location information of the first virtual character from the server;
present a map according to the map data;
render the second virtual character on the map according to the geographical location information of the second virtual character; and
send the interaction request initiated by the first virtual character to the second virtual character via the server in response to a selection operation on the second virtual character on the map.

12. The system according to claim 11, wherein the second virtual character is one of a plurality of second virtual characters, wherein the geographical location information of the second virtual character comprises geographical location information and feature data of each of the plurality of second virtual characters, and
wherein the at least one processor is further operable to read the program code, and operate as instructed by the program code to control the first user terminal to:
determine, for each of the plurality of second virtual characters, a corresponding location according to corresponding geographical location information of each of the plurality of second virtual characters; and
render each of the plurality of second virtual characters on the corresponding location.

13. The system according to claim 11, wherein the second virtual character is one of a plurality of second virtual characters, wherein the geographical location information of the second virtual character comprises one or more pieces of geographical location information and a quantity of second virtual characters corresponding to each of the one or more pieces of geographical location information, and
wherein the at least one processor is further operable to read the program code, and operate as instructed by the program code to control the first user terminal to:
determine, according to each of the one or more pieces of geographical location information, a corresponding location on the map;
present, at the corresponding location, an identifier indicating a quantity of second virtual characters corresponding to the corresponding location;
send, to the server in response to an operation on the identifier, a request for feature data and geographical location information of each second virtual character corresponding to the identifier;

receive the feature data and the geographical location information of each second virtual character corresponding to the identifier from the server; and present each second virtual character corresponding to the identifier on the map according to the feature data and the geographical location information received from the server.

14. The system according to claim 10, wherein the at least one processor is further operable to read the program code, and operate as instructed by the program code to control the first user terminal to capture the real scene image in which the first user terminal is located using a camera of the first user terminal.

15. The system according to claim 10, wherein the at least one processor is further operable to read the program code, and operate as instructed by the program code to control the first user terminal to receive the interaction scene image from the server according to the interaction request.

16. The system according to claim 15, wherein the real scene image corresponds to the geographical location information of the first virtual character, and wherein the at least one processor is further operable to read the program code, and operate as instructed by the program code to control the first user terminal to render the first virtual character and the second virtual character into the real scene image corresponding to the location information of the first virtual character.

17. The system according to claim 15, wherein the interaction request comprises designated location information corresponding to the first user terminal, wherein the real scene image corresponds to the designated location information, and wherein the at least one processor is further operable to read the program code, and operate as instructed by the program code to control the first user terminal to render the first virtual character and the second virtual character into the real scene image of a location corresponding to the designated location information.

18. The system according to claim 10, further comprising a server, the server comprising: at least one memory operable to store program code; and at least one processor operable to read the program code, and operate as instructed by the program code to:

receive geographical location information of the first virtual character from the first user terminal;

search the mapping table for information about a second virtual character within the range corresponding to the geographical location information of the first virtual character;

send information identifying the second virtual character to the first user terminal;

receive the interaction request from the first user terminal;

establish the first connection to the first user terminal and the second connection to the second user terminal corresponding to the second virtual character according to the interaction request;

generate the interaction scene image according to the interaction request;

send the interaction scene image to the first user terminal;

receive, through the first connection, the interaction content from the first user terminal; and send the interaction content to the second user terminal through the second connection.

19. A non-transitory computer-readable storage medium having stored therein a computer readable code, which, when executed by a computer, causes the computer to perform: before sending geographical location information of a first virtual character to a server:

obtaining facial feature data, in response to a facial scanning operation of an end user; and obtaining decoration data, in response to a selection by the end user;

blending the obtained facial feature data and the obtained decoration data with one or more corresponding facial features of a preset virtual character model to generate the first virtual character; and sending a virtual character creation request to the server, the virtual character creation request comprising data of the generated first virtual character;

obtaining the geographical location information of the first virtual character corresponding to the first user terminal;

sending the sending geographical location information of the first virtual character to the server, the server storing information identifying the first virtual character and the geographical location information of the first virtual character in a mapping table;

receiving, from the server, information identifying a second virtual character within a range of the sent geographical location information of the first virtual character;

sending, to the server, an interaction request for the second virtual character, based on the received information identifying the second virtual character, the interaction request causing the server to establish a first connection to the first user terminal and a second connection to a second user terminal corresponding to the second virtual character;

obtaining an interaction scene image, the interaction scene image being a real scene image corresponding to the first user terminal;

rendering the first virtual character and the identified second virtual character into the obtained interaction scene image;

obtaining interaction content; and sending the obtained interaction content to the server through the established first connection, the interaction content causing the server to send the interaction content to the second user terminal through the established second connection.

* * * * *